United States Patent
Drollinger et al.

(10) Patent No.: US 11,801,843 B2
(45) Date of Patent: Oct. 31, 2023

(54) METHOD, SYSTEM, AND COMPUTER PROGRAM PRODUCT FOR DETERMINING SAFETY-CRITICAL TRAFFIC SCENARIOS FOR DRIVER ASSISTANCE SYSTEMS (DAS) AND HIGHLY AUTOMATED DRIVING FUNCTIONS (HAD)

(71) Applicant: Dr. Ing. h.c. F. Porsche Aktiengesellschaft, Stuttgart (DE)

(72) Inventors: Nadine Drollinger, Pforzheim (DE); Phillip Mielke, Filsen (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 25 days.

(21) Appl. No.: 17/364,840

(22) Filed: Jun. 30, 2021

(65) Prior Publication Data
US 2022/0080975 A1    Mar. 17, 2022

(30) Foreign Application Priority Data

Sep. 15, 2020    (DE) ..................... 10 2020 123 976.9

(51) Int. Cl.
*B60W 40/04*    (2006.01)
*B60W 40/08*    (2012.01)
(Continued)

(52) U.S. Cl.
CPC ............ *B60W 40/04* (2013.01); *B60W 40/08* (2013.01); *B60W 60/0015* (2020.02);
(Continued)

(58) Field of Classification Search
CPC ................. B60W 40/04; B60W 40/08; B60W 2040/0872; B60W 60/0015;
(Continued)

(56) References Cited

U.S. PATENT DOCUMENTS 10,625,748 B1 *    4/2020    Dong ................ B60W 30/0956
10,723,358 B2 *    7/2020    Zheng .................. G05D 1/0011
(Continued)

FOREIGN PATENT DOCUMENTS

DE    10 2016 201 939    8/2017
DE    10 2017 212 908    1/2019
(Continued)

OTHER PUBLICATIONS

German Search Report dated Feb. 2, 2021.

*Primary Examiner* — Russell Frejd
*Assistant Examiner* — Brandon Z Willis
(74) *Attorney, Agent, or Firm* — Gerald E. Hespos; Michael J. Porco

(57) ABSTRACT

A method determines safety-critical traffic scenarios for driver assistance systems and highly automated driving functions for a motor vehicle. A safety-critical traffic scenario has a scenario type, a location determined geographic coordinates, and a safety value. The method includes: recording first data of a vehicle while driving along a route, assigning geographic coordinates to the first data in each case; recording second data for capturing physiological and physical reactions of a driver of a vehicle while driving along the route, assigning geographic coordinates to the second data in each case; transmitting the first and second data to a data evaluation unit; combining the first data and the second data having the same geographic coordinates so that they represent data at a specific geographic location; identifying a scenario for the specific geographic location based on the first and second data; classifying the identified scenario with a difficulty value.

14 Claims, 2 Drawing Sheets

(51) Int. Cl.
    *B60W 60/00* (2020.01)
    *G06F 18/24* (2023.01)
(52) U.S. Cl.
    CPC ......... *G06F 18/24* (2023.01); *B60W 2420/42* (2013.01); *B60W 2540/21* (2020.02); *B60W 2540/221* (2020.02); *B60W 2555/20* (2020.02); *B60W 2756/10* (2020.02)
(58) Field of Classification Search
    CPC ....... B60W 2420/403; B60W 2420/42; B60W 2420/52; B60W 2420/54; B60W 2540/10; B60W 2540/12; B60W 2540/21; B60W 2540/22; B60W 2540/221; B60W 2540/225; B60W 2555/20; B60W 2756/10; G06K 9/6267
    See application file for complete search history.

(56) References Cited

U.S. PATENT DOCUMENTS

| | | | |
|---|---|---|---|
| 2018/0293449 A1 | 10/2018 | Sathyanarayana et al. | |
| 2019/0156134 A1* | 5/2019 | Krishnan | G06V 20/59 |
| 2020/0286310 A1* | 9/2020 | Carver | G06Q 40/08 |
| 2021/0389769 A1* | 12/2021 | Hari | B60W 60/0015 |
| 2022/0050445 A1* | 2/2022 | Fleck | B60W 40/09 |

FOREIGN PATENT DOCUMENTS

| | | |
|---|---|---|
| DE | 10 2018 206 666 | 10/2019 |
| DE | 10 2019 000 060 | 7/2020 |

* cited by examiner

METHOD, SYSTEM, AND COMPUTER PROGRAM PRODUCT FOR DETERMINING SAFETY-CRITICAL TRAFFIC SCENARIOS FOR DRIVER ASSISTANCE SYSTEMS (DAS) AND HIGHLY AUTOMATED DRIVING FUNCTIONS (HAD)

CROSS REFERENCE TO RELATED APPLICATION

This application claims priority under 35 USC 119 to German Patent Appl. No. 10 2020 123 976.9 filed on Sep. 15, 2020, the entire disclosure of which is incorporated herein by reference.

BACKGROUND

Field of the Invention

The invention relates to a method, to a system, and to a computer program product for determining safety-critical traffic scenarios for driver assistance systems (DAS) and highly automated driving functions (HAD) for at least one moving object, such as in particular a motor vehicle, wherein a safety-critical traffic scenario has at least a scenario type, a location that is determinable by means of geographic coordinates, and a safety value.

Related Art

The trend toward driver assistance systems (DAS) and highly automated driving functions (HAD) in motor vehicles, aircraft and watercraft requires extensive security strategies because the driver no longer has unrestricted responsibility regarding vehicle control. Rather, active functions are assumed by computing units in the vehicle. For this reason it must be ensured that autonomously moving objects have only a very low error rate in terms of the driving behavior. Identification and classification of objects and the interpretation of traffic scenarios in the vicinity of a vehicle are important prerequisites for a safe function of driver assistance systems. Targeted testing both of corner cases (i.e. extreme and exceptional situations) and also of daily situations is required. Such extreme cases are the result of a specific combination of various factors. Examples of these are infrastructural particularities, such as the road type, roadside structures, the quality of the markings, environmental conditions, such as weather, the time of day, and the season. The behavior of other road users also is an important factor. Geographic topography and weather conditions play a major role in aircraft and watercraft.

Traffic-related exceptional situations are difficult to find in the real world because a few events and situations seldomly occur. Moreover, evaluation of available traffic data, such as the data of test vehicles that are used for data collection, is difficult because relevant data often are not classified sufficiently and thus discoverable.

However, a human driver frequently reacts highly intuitively and quickly to a specific dangerous situation and in the process exhibits typical physiological reactions, such as an increase in heart rate and dilated pupils, and also exhibits physical reactions in the vehicle, such as a sudden activation of the brake apparatus.

DE102016201939A1 describes a system for capturing a sudden increase in the drivers attention by way of suitable sensors. In addition, the viewing direction of the driver can in this situation be registered using sensors. These data are used to determine an object in the vicinity of the driver and to justify intervention in the driving behavior of the vehicle.

DE102018206666A1 describes a method for alerting a driver of the vehicle to a situation in which a low performance of the driver occurs. To this end, a driving situation signal representing a current driving situation is read. Using the driving situation signal and an expected drop in performance of the driver, a warning signal is output if the current driving situation corresponds to a driving situation with an expected drop in performance.

The object on which the invention is based is thus the creation of a method, a system, and a computer program product for determining safety-relevant scenarios for driver assistance systems (DAS) and highly automated driving functions (HAD) for at least one moving object, such as a motor vehicle, which comprehensively identifies and classifies possibly occurring safety-relevant scenarios along a route.

SUMMARY

The invention relates to a method, a system, and a computer program product by means of which a comprehensive determination of safety-relevant traffic scenarios is made possible to create in this way the basis for providing driver assistance systems and highly automated driving functions and/or flying functions that are characterized by a high degree of safety and reliability both in daily situations and in journey-related extreme situations.

According to a first aspect, the invention relates to a method for determining safety-critical traffic scenarios $S1, S2, \ldots, Sn$ for driver assistance systems (DAS) and highly automated driving functions (HAD) for at least one moving object, such as a motor vehicle. A safety-critical traffic scenario $Si(x,y,z)$ has at least a scenario type $Si$, a location that is determinable by means of geographic coordinates, and a safety value $W_i$. The method includes:

recording first data and/or images by detectors and sensors of a vehicle while driving along a route, wherein the first data and/or images are in each case assigned geographic coordinates;

transmitting the first data and/or images to a data evaluation unit;

recording second data and/or images by sensors for capturing physiological and physical reactions of a driver of a vehicle while driving along the route, wherein the second data and/or images are assigned in each case geographic coordinates;

transmitting the second data and/or images to a data evaluation unit;

combining the first data and the second data having the same geographic coordinates with one another, with the result that they represent data at a specific geographic location;

identifying a scenario $S_i(x,y,z)$ for the specific geographic location based on the first and second data;

classifying the identified scenario $S_i(x,y,z)$ with a difficulty value $W_i$.

Features of possible scenario types $S_1, S_2, \ldots, S_n$ may be extracted from the transmitted first and second data in an extraction module of the data evaluation unit.

Features from the extraction module may be transmitted to a classification module having algorithms for classifying purposes, and the classification module may assign one or a plurality of predefined scenario types $S_1, S_2, \ldots, S_n$ to the extracted features and identify at least one fitting scenario type $S_i$. The identified real scenario $Sj(x,y,z)$ is stored with geographic coordinates and/or further metadata, such as the time of the data recording, in a storage module.

Further data sources that are used may include cartographic information, data relating to traffic figures, aerial recordings, and/or data relating to weather information, and/or data from a shadow module.

The sensors for the second data may be heart rate monitors, infrared cameras, glasses having optical sensors, interior cameras, movement sensors, acceleration sensors, pressure sensors, and/or microphones for recording physiological and physical measurement data of the driver and/or of the occupants, such as the heart rate and/or the skin temperature and/or images of the pupils of the driver and/or sudden brake activations and/or steering activities and/or vocal utterances.

Limit values for the second data may be defined in the data evaluation unit and an exceedance of a limit value to be used for a classification of the identified scenario $S_i(x,y,z)$ with a difficulty value $W_i$.

Specifically, a scenario type Sj represents a road scene and/or a traffic situation.

According to a second aspect, the invention relates to a system for determining safety-critical traffic scenarios $S_1$, $S_2$, ..., $S_n$ for driver assistance systems (DAS) and highly automated driving functions (HAD) for at least one moving object, such as a motor vehicle. A safety-critical traffic scenario $S_i(x,y,z)$ has at least a scenario type $S_i$, a location that is determinable by means of geographic coordinates, and a safety value $W_i$. The system comprises detectors and sensors of a vehicle that record first data and/or images while driving the vehicle along a route and to transmit the first data and/or images to a data evaluation unit. Geographic coordinates are assigned in each case to the first data and/or images. Furthermore, sensors are provided to capture second data and/or images of physiological and physical reactions of a driver of a vehicle while driving along the route and to transmit the second data and/or images to a data evaluation unit. Geographic coordinates are assigned in each case to the second data and/or images. The data evaluation unit combines the first data and the second data having the same geographic coordinates with one another so that they represent data at a specific geographic location. The data evaluation unit identifies a scenario $S_i(x,y,z)$ for the specific geographic location based on the first and second data, and classifies the identified scenario $S_i(x,y,z)$ with a difficulty value $W_i$.

The data evaluation unit may have an extraction module, a classification module, and a storage module. The extraction module extracts features of possible scenario types $S_1$, $S_2$, ..., $S_n$ from the transmitted first and second data.

Features may be transmitted from the extraction module to a classification module having algorithms for classification purposes. Thus, the classification module assigns one or more predefined scenario types $S_1$, $S_2$, ..., $S_n$ to the extracted features and identifies at least one fitting scenario type $S_i$. The identified real scenario Sj(x,y,z) is stored with geographic coordinates and/or further metadata, such as the time of the data recording, in a storage module.

Further data sources that are used may be cartographic information, data relating to traffic figures, aerial recordings, and/or data relating to weather information, and/or data from a shadow module.

The sensors for the second data may be heart rate monitors, infrared cameras, spectacles having optical sensors, interior cameras, movement sensors, acceleration sensors, pressure sensors, and/or microphones for recording physiological and physical measurement data of the driver and/or of the occupants, such as the heart rate and/or the skin temperature and/or images of the pupils of the driver and/or sudden brake activations and/or steering activities and/or vocal utterances.

In one development, limit values for the second data are defined in the data evaluation unit and an exceedance of a limit value is used for a classification of the identified scenario $S_i(x,y,z)$ with a difficulty value $W_i$.

Specifically, a scenario type Sj represents a road scene and/or a traffic situation.

According to a third aspect, the invention provides a computer program product comprising an executable program code that is configured such that, upon its execution, it carries out the method according to the first aspect.

The invention will be explained in more detail below on the basis of exemplary embodiments illustrated in the drawing.

DETAILED DESCRIPTION

Driver assistance systems intervene partially autonomously or autonomously in the propulsion, the control or signaling devices of a vehicle or alert the driver just before or during critical situations by way of suitable human-machine interfaces. The identification and classification of traffic situations and objects and also the interpretation of the traffic scenario in the vicinity of the vehicle are significant for the performance of driver assistance systems (DAS) and highly automated driving functions (HAD).

The different traffic situations can be assigned scenario types $S_1$, $S_2$, ..., $S_n$ that can be characterized by specific features. A scenario type is thus determined by combining specific features. Examples of features are the signage or the road infrastructure, such as the type of road surface, the number of lanes, possible construction sites. For example, the scenario type of a bridge is determined by features such as a railing on the left and on the right of the road and a visible transition on the road. The scenario type of a motorway tunnel can be characterized by features such as ceiling lamps, a wall with doors, and a field of view that is dark overall.

In addition to the identification of scenario types, for example a specific scene, such as a bridge, a tunnel, a multi-lane roundabout, or traffic lights on the motorway, the difficulty level $W_i$ of a specific traffic scenario is important. For example, the scenario of a tunnel at a location X may be easy to manage for a driver assistance system, while a tunnel at a location Y has a significant difficulty level and is thus associated with greater safety requirements. It is therefore necessary to classify the respective traffic situations or scenarios with respect to their safety requirements. In addition to a general classification of a traffic situation or of a scenario as an extreme situation, preferably a specific classification is also performed. For example, one extreme situation can include the increased probability of a collision with another motor vehicle on a specific motorway section, while another extreme situation includes the probability of damage caused by game along a road section passing through a forested area.

Figure 1:
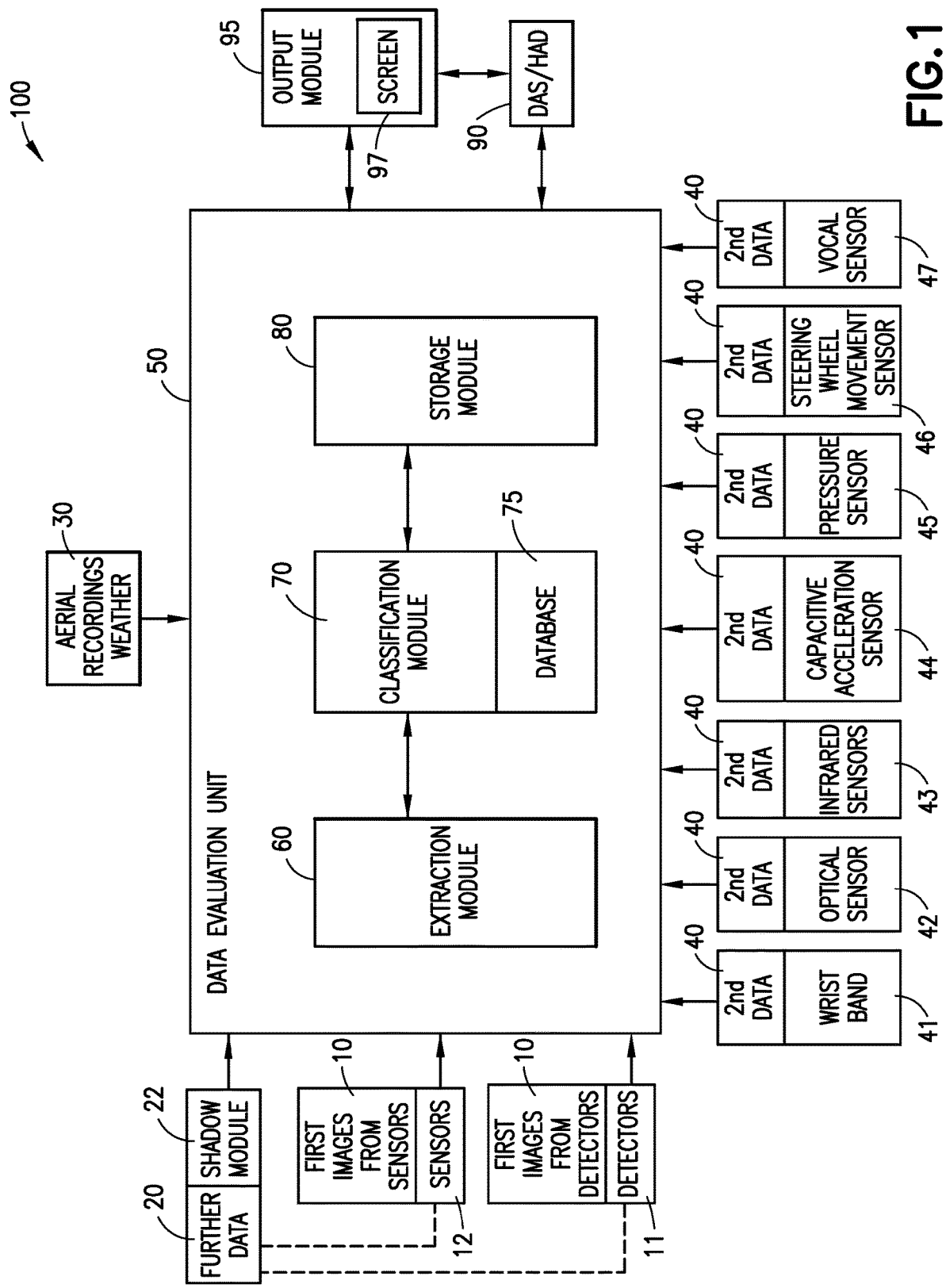
FIG. 1 shows a block diagram for explaining an exemplary embodiment of a system according to the invention.

FIG. 1 shows a system 100 according to the invention for determining safety-critical traffic situations or scenarios for driver assistance systems (DAS) and highly automated driving functions (HAD) for a moving object along a route. The moving objects can be a motor vehicle, such as a passenger car or a truck, an aircraft, or a watercraft, wherein the aircraft are in particular unmanned aerial vehicles (drones), and the watercraft are in particular ships, boats, and ferries.

According to the invention, first data and images 10 of road scenes and/or traffic situations or geographic topographies of a route are captured using different detectors 11 and sensors 12, which are mounted for example in a test vehicle. The detectors 11 and sensors 12 are preferably one or more cameras imaging a specific scene and/or a traffic situation. However, they may also be acoustic sensors, LIDAR (light detection and ranging) systems with optical distance and speed measurement, stereoscopic optical camera systems, ultrasound systems, or radar systems. The data 10 therefore preferably consist of sensor data and camera images. The images and data 10 can be recorded by test objects, such as test vehicles or test drones, that travel or fly along a specific route or section and record said route with the detectors 11 and sensors 12. Moreover, data 10 can also be provided through communication with the vicinity of the vehicle, in particular with other vehicles, such as Car2Car communication, or stationary information systems.

The first data and images 10 are stored, either in corresponding storage units or modules of the detectors 11 and sensors 12 or in external storage modules, such as a cloud computing storage unit. In particular, the captured data and images 10 are stored with the geographic coordinates, the time of data capturing, and other metadata.

In the context of the invention, a "storage unit" or "storage module" and the like can be understood to mean, for example, a volatile memory in the form of random access memory (RAM) or a permanent memory such as a hard disk drive or a data medium or, for example, a replaceable storage module or a cloud-based storage solution.

In the context of the invention, a "module" can be understood to mean, for example, a processor and/or a storage unit for storing program commands. By way of example, the processor and/or the control unit is specifically configured to carry out the program commands in such a way that the processor and/or the control unit carries out functions to implement or realize the method according to the invention or a step of the method according to the invention.

Moreover, second data 40, which are generated by the driver of the moving object, in particular of a motor vehicle, themselves while driving along the route, are captured and evaluated according to the invention. The background for this is that, generally, dangerous situations in traffic represent a particular burden and thus stress situation for a driver of a motor vehicle and give rise to physical and psychological stress reactions in order to manage said situation. On a biochemical level, a stress situation results within seconds in a release of stress hormones, such as adrenaline, noradrenaline, cortisol and cortisone, whereby a vegetative effect chain is triggered, which gives rise to an increase in blood pressure, in blood sugar, and generally the muscle tone. The heart rate and pulse frequency are increased by the sympathetic nervous system, and the coronary arteries dilate. The blood vessels in the skin and the inner organs contract and the pupils dilate so as to be able to see better. This prepares the body for fight or flight.

According to the invention, the physiological and physical reactions of the driver are captured by means of suitable sensors and used for a classification of driving situations. Moreover, it is also possible to capture the reactions of the vehicle occupants. Sensors 41 used can be measurement bands such as fitness trackers for example by FITBIT® or other manufacturers, which continuously measure the heart rate. These fitness bands can be attached to the wrist of the driver or of the occupants, and the measured data can simply be read. The pulse and consequently the heart rate is measured optically in these devices generally by means of the change in the reflection behavior of the emitted LED light in the case of a change of the blood flow owing to the contraction of the blood capillary vessels when the heart beats. The device typically emits light in the green wavelength range into the tissue at the wrist and measures the reflected light. Since blood strongly absorbs the light in this wavelength range, the measured light intensity fluctuates as the blood vessels pulsate, from which the heart rate can be determined. In a stress situation, the heart rate accelerates, meaning that the changed heart rate is a good indicator of the presence of a stress situation.

However, it is also possible to use items of clothing equipped with sensors or smartwatches or corresponding glasses. Moreover, optical sensors 42 such as interior cameras can be used to record the change in facial expression and gesticulation of the driver, such as dilated pupils as a sign of a fear reaction. Likewise conceivable are infrared cameras 43 for measuring the skin surface temperature and sensors for ascertaining perspiration. Sensors inside the body are likewise conceivable, such as smart pills, which exist in the form of pills and may be swallowed. They can ascertain chemical reactions inside the body and transmit the ascertained data to an external storage device, for example by way of a radio link.

A sudden change in a parameter such as the heart rate indicates the identification of a dangerous situation by way of the driver. Advantageously, a characteristic deviation from a normal value is therefore defined as a limit value that indicates such an extreme situation. Furthermore, direct physical reactions of the driver, such as steering activity and the activation of the brake pedal, and of the occupants in the motor vehicle can be captured. This may be the sudden and forceful activation of the brake apparatus by way of the driver when said driver wishes to avoid the risk of a collision with another vehicle. The brake apparatus is provided with braking sensors 43, which register a quick and sudden change in the braking behavior. The sensors 44 can be embodied in the form of capacitive acceleration sensors. Moreover, pressure sensors 45 at the steering wheel and in the driver seat are conceivable, which ascertain a firmer grip of the steering wheel and a greater pressure acting on the seat by way of the driver and/or the occupants when said driver grips the steering wheel more tightly and pushes more strongly into the seat due to the increase in muscle tone occurring during the stress situation. Fast and jerky steering movements of the steering wheel can also be captured using corresponding movement sensors 46. Characteristic deviations from a normal value indicate such an extreme situation here as well.

A dangerous situation can, however, also lead to spontaneous vocal utterances by the driver, for example to express annoyance, or be accompanied by warnings communicated by a front passenger. These acoustic signals can be recorded by a microphone 47.

Moreover, further data 20 can be used, which are captured by a shadow module 22 in a vehicle. The shadow module 22 has separate data capturing systems or is connected to the detectors 11 and sensors 12.

The shadow module 22 triggers the data capturing systems and/or detectors 11 and sensors 12 by way of background functions in the case of a moving vehicle and therefore operates in what is known as the shadow mode. The vehicles can be test vehicles or even customer vehicles. This equally applies in the case of aircraft or watercraft. Triggers that react to a specific behavior of individual components of the vehicle are provided in the shadow module 22. For example, acceleration values exceeding specific values may activate a trigger, with the result that the corresponding data capturing systems then capture a road scene or a traffic situation. The data and images 10, 20 recorded by the detectors 11, sensors 12, and the data capturing systems of the shadow module 22 are either stored in a data memory of the detectors 11 and sensors 12 or are transmitted directly to the shadow module 22. In this case, these captured data and images 10, 20 are also stored in each case with spatial coordinates, the time of data capturing, and other metadata.

Moreover, additional data sources 30 or databases can be used. These include in particular databases including data relating to the road network with road specifications, such as for example lanes and bridges, the road infrastructure, such as for example the road surface, roadside structures, the road layout, which are made available by authorities. However, the federal database for capturing all accidents involving serious injuries, which is provided by the German Federal Statistical Office, is another important data source. Similar datasets are also available in many other countries.

In addition, traffic figures such as hourly traffic flow at a specific traffic scene are of interest for specific scenario types, such as a traffic jam. The data are made available freely accessibly by the German Federal Highway Research Institute.

A further data source 30 are aerial recordings, for example by Google Maps. However, Mapillary can also be used for road images. Mapillary collects user-generated road images with geo-tags recorded by dash cams and smart phones. These images are available under an open source license.

Since weather conditions can likewise define a scenario type, weather data represent a further data source 30. Weather data in this case comprise historical weather measurements and future weather forecasts.

The calculation and storage of all geographic objects preferably takes place in the EPSG 25832 coordinate system (Universal Transverse Mercator (UTM) Zone 32N). This system is also used by the authorities in Germany. The lateral and the longitudinal positions are illustrated in meters. Moreover, global reference systems such as the "World Geodetic System 1984 (WGS 84)" can be used, which is also used in GPS (global positioning system) receivers. In this way it is possible for example to import the entire map content of Germany.

The captured and partially prepared data 10, 20, 30 are supplied to a data evaluation unit 50.

The second data 40, recorded by the sensors 41, 42, 43, 44, 45, 46, 47, relate to the physical and physiological reactions of the driver and/or the occupants of a vehicle are stored in storage units of the sensors 41, 42, 43, 44, 45, 46, 47 and/or are stored in external storage modules and supplied to the data evaluation unit 50.

Scenarios and traffic situations that are relevant for driving assistance systems (DAS) and highly automated driving functions (HAD) in motor vehicles are identified in the data evaluation unit 50. The first data of the detectors 11 and 12 are combined with the second data of the sensors 41, 42, 43, 44, 45, 46, 47, and/or with the data 20 generated in the shadow mode 22, and/or with further data 30 in order to increase the probability of identifying traffic scenarios representing extreme situations.

The data evaluation unit 50 can have an extraction module 60, a classification module 70, and a storage module 80. The extraction module 60 extracts relevant features for characterizing traffic scenarios from the first data 10 of the detectors 11, sensors 12, the second data 40 of the sensors 41, 42, 43, 44, 45, 46, 47, which capture the physiological and physical reactions of the driver and/or of the occupants, and from the data 20 of the shadow module 22 and the other data sources 30. These features are preferably passed on to a classification module 70.

The classification module 70 has algorithms of artificial intelligence for classifying and assigns the features one or a plurality of fitting scenario types $S_1, S_2, \ldots, S_n$ and a difficulty level $W_i$. These scenario types $S_1, S_2, \ldots, S_n$ were predefined and are stored in a database 75. For example, sudden and pronounced steering movements can indicate different types of extreme situations than angry utterances by the driver, for example.

An identified real scenario $S_i(x,y,z)$ is stored together with a calculated difficulty value $W_i$ and the geographic position and other metadata, such as the time of data capturing, in the storage module 80. Said scenario can be retrieved from the storage module 80 by driver assistance systems (DAS) and highly automated driving functions (HAD) 90, for example when driving along a route.

Moreover, the identified real scenarios $S_i(x,y,z)$ can be used by an output module 95. The output module 95 has route planning and navigation algorithms and has access to the storage module 80. The output module 95 preferably has a screen 97 and user interfaces, for example to present a digital map of a planned route. The scenarios $S_i(x,y,z)$ that have a high difficulty value $W_i$ and were therefore identified and classified as safety-relevant can be correspondingly marked on the digital map. In particular, the screen 97 of the output module 95 is the screen of the navigation system of the vehicle. However, it is also conceivable that a mobile device of the user, such as a smartphone, is used alone or additionally as the output module 95 and user interface. It is likewise conceivable for a computer to be provided as the output module 95 for example in a test and development center.

Figure 2:
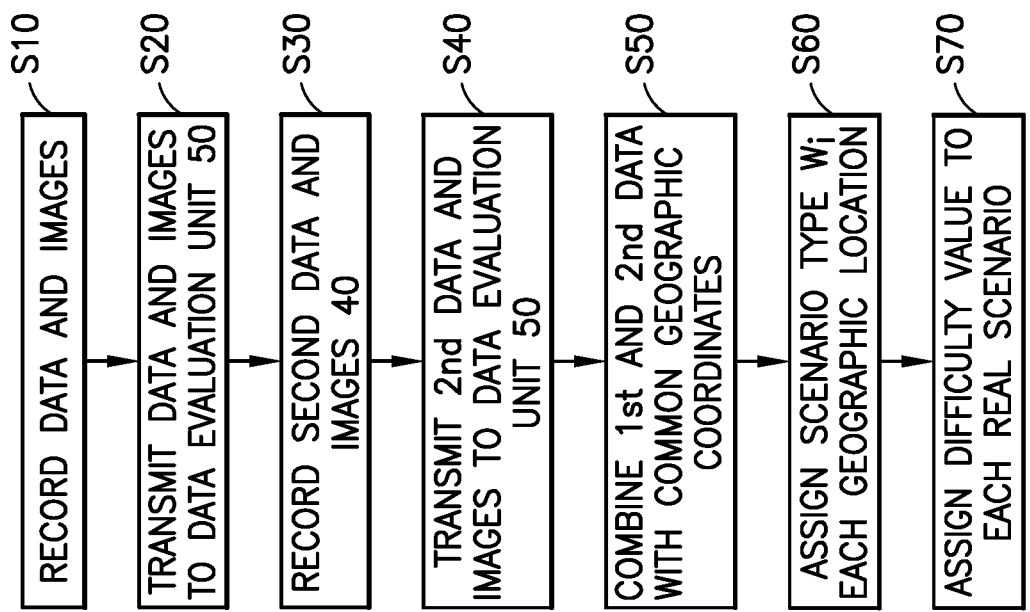
FIG. 2 shows a flowchart for explaining the individual method steps of the method according to the invention.

FIG. 2 illustrates the method steps of the method according to the invention. In step S10, first data 10 and/or images are recorded by detectors 11 and sensors 12 while a vehicle is driving along a route, wherein the first data 10 and images are assigned in each case geographic coordinates.

In step S20, the first data and/or images 10 recorded by the detectors 11 and sensors 12 are transmitted to a data evaluation unit 50.

In step S30, second data and/or images 40, which capture physiological and/or physical reactions of a driver of the vehicle, are recorded by sensors 41, 42, 43, 44, 45, 46, 47 while driving along the route, wherein the second data and/or images 40 are assigned in each case geographic coordinates.

In step S40, the second data and/or images 40 recorded by the sensors 41, 42, 43, 44, 45, 46, 47 are transmitted to a data evaluation unit 50.

In a step S50, the first data 10 and the second data 40 having the same geographic coordinates are combined with one another, with the result that they represent data at a specific geographic location.

In step S60, the first and second data 10, 40 are assigned at a specific geographic location at least one fitting scenario type $S_i$ and a real scenario $S_i(x,y,z)$ is identified.

In step S70, the identified real scenario $S_i(x,y,z)$ is assigned a difficulty value $W_i$.

Figure 3:
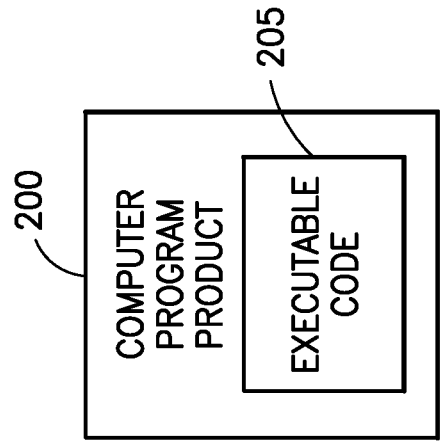
FIG. 3 schematically shows a computer program product according to an embodiment of the third aspect of the invention.

FIG. 3 schematically illustrates a computer program product 200 comprising an executable program code 205, which is configured to perform, upon its execution, the method according to the first aspect of the present invention.

Using the method of the invention, it is possible by capturing the physiological and physical reactions of the driver and of the occupants to better identify and classify traffic scenarios that have a high difficulty level and therefore represent an extreme situation. For example, if such situations increasingly occur at specific geographic locations, the probability that prior art DAS and HAD systems will exhibit weaknesses there is high. These scenarios having a high difficulty level can be marked on a digital map to select these locations even better for test drives.

REFERENCE DESIGNATIONS

10 Data
11 Detector
12 Sensor
20 Data
22 Shadow module
30 Data
40 Data
41 Sensor
42 Sensor
43 Sensor
44 Sensor
45 Sensor
46 Sensor
47 Sensor
50 Data evaluation unit
60 Extraction module
70 Classification module
75 Database
80 Storage module
90 DAS and HAD systems
95 Output module
97 Screen
100 System
200 Computer program product
205 Program code

What is claimed is:

1. A method for determining safety-critical traffic scenarios for driver assistance systems and highly automated driving functions for a motor vehicle, wherein a safety-critical traffic scenario has at least a scenario type, a location that is determinable by means of geographic coordinates, and a safety value, comprising the following method steps:

recording first data and/or first images obtained from first detectors and first sensors of a vehicle while driving along a route, the first data and/or the first images relating to relationships between the motor vehicle and surroundings of the motor vehicle wherein the first data and/or the first images are in each case assigned geographic coordinates;

transmitting the first data and/or the first images to a data evaluation unit;

recording second data and/or second images by second sensors for capturing physiological and physical reactions of a driver of a vehicle while driving along the route, at least one of the second sensors being worn on a wrist of the driver and sensing at least a heart rate of the driver wherein the second data and/or the second images are assigned in each case geographic coordinates;

transmitting the second data and/or the second images to the data evaluation unit;

combining the first data and the second data having the same geographic coordinates with one another so that they represent data at specific geographic locations;

identifying a scenario for each of the specific geographic locations based on the first and second data;

classifying the identified scenario with a difficulty value, wherein limit values for the second data are defined in the data evaluation unit and an exceedance of a limit value is used for a classification of the identified scenario with a difficulty value.

2. The method of claim 1, wherein features of possible scenario types are extracted from the transmitted first and second data in an extraction module of the data evaluation unit.

3. The method of claim 2, wherein the features are transmitted from the extraction module to a classification module having algorithms for classification purposes, the classification module assigns one or more predefined scenario types to the extracted features and identifies at least one fitting scenario type, and the identified real scenario is stored in a storage module with geographic coordinates and a time of the data recording.

4. The method of claim 1, additionally comprising obtaining further data that include at least one of: cartographic information, traffic figures, aerial recordings, weather information, and data from a shadow module.

5. The method of claim 1, wherein the sensors for the second data and/or second images include at least one of: infrared cameras, spectacles having optical sensors, interior cameras, movement sensors, acceleration sensors, pressure sensors, microphones for recording physiological and physical measurement data of the driver and/or of the occupants, skin temperature monitors, pupil imaging monitors for monitoring images of pupils of the driver, brake activation monitors for monitoring sudden brake activations, steering monitors for monitoring steering activities and noise monitors for monitoring vocal utterances.

6. The method of claim 1, wherein a scenario type represents a road scene and/or a traffic situation.

7. A computer program product having an executable program code, which is configured to perform, upon its execution, the method of claim 1.

8. A system for determining safety-critical traffic scenarios for driver assistance systems and highly automated driving functions for a motor vehicle, wherein a safety-critical traffic scenario has: at least a scenario type; a location that is determinable by geographic coordinates; and a safety value, the system comprising:

first detectors and first sensors defining parts of a vehicle that are embodied to record first data and/or first images relating to relationships between the motor vehicle and surroundings of the motor vehicle while the vehicle is driving along a route and to transmit the first data and/or first images to a data evaluation unit, wherein the first data and/or first images are in each case assigned geographic coordinates;

second sensors to capture second data and/or second images of physiological and physical reactions of a driver of the vehicle while driving along the route and to transmit the second data and/or second images to the data evaluation unit, at least one of the second sensors being worn on a wrist of the driver and sensing at least a heart rate of the driver, wherein the second data and/or the second images are in each case assigned geographic coordinates; and wherein the data evaluation unit is embodied to combine the first data and the second data having the same geographic coordinates with one another so that they represent data at a specific geographic location, to identify a scenario for the specific geographic location based on the first and second data, and to classify the identified scenario with a difficulty value, wherein limit values for the second data are defined in the data evaluation unit and an exceedance of a limit value is used for a classification of the identified scenario with a difficulty value.

9. The system of claim 8, wherein the data evaluation unit has an extraction module, a classification module, and a storage module, wherein the extraction module is embodied to extract features of possible scenario types from the transmitted first and second data.

10. The system of claim 9, wherein the features are transmitted by the extraction module to a classification module having algorithms for classification purposes, the classification module assigns one or more predefined scenario types to the extracted features and identifies at least one fitting scenario type, and the identified real scenario is stored with geographic coordinates and/or further metadata.

11. The system of claim 8, additionally comprising further data sources that include cartographic information, data relating to traffic figures, aerial recordings, data relating to weather information, and/or data from a shadow module.

12. The system of claim 8, wherein the sensors for the second data and/or second images further comprise infrared cameras, spectacles having optical sensors, interior cameras, movement sensors, acceleration sensors, pressure sensors, and/or microphones for recording physiological and physical measurement data of the driver and/or of the occupants.

13. The system of claim 8, wherein a scenario type represents a road scene and/or a traffic situation.

14. The system of claim 8, wherein the second sensors that is worn on the wrist of the driver is a smart watch.

* * * * *